United States Patent [19]

Seib

[11] 4,248,416
[45] Feb. 3, 1981

[54] SHEET FEED EQUIPMENT

[75] Inventor: Martin R. P. Seib, London, England

[73] Assignee: Martin Seib Limited, Stanmore, United Kingdom

[21] Appl. No.: 11,089

[22] Filed: Feb. 12, 1979

[30] Foreign Application Priority Data

Feb. 17, 1978 [GB] United Kingdom ................ 6346/78

[51] Int. Cl.³ .............................................. B65H 5/00
[52] U.S. Cl. ..................................... 271/10; 271/137; 271/141; 271/165; 271/227; 271/251
[58] Field of Search ...................... 271/4, 10, 131, 137, 271/138, 141, 142, 248, 251, 227, 234, 239, 165

[56] References Cited

U.S. PATENT DOCUMENTS

| 2,093,555 | 9/1937 | Ford | 271/137 |
|---|---|---|---|
| 2,608,408 | 8/1952 | Gibson | 271/248 |
| 2,674,456 | 4/1954 | Gibson | 271/251 |
| 3,108,800 | 10/1963 | Walsh | 271/239 X |
| 3,148,877 | 9/1964 | Brearley . | |
| 3,734,490 | 5/1973 | Parks | 271/251 X |
| 3,790,159 | 2/1974 | Hatzmann | 271/4 |
| 4,052,054 | 10/1977 | Cardwell | 271/251 X |

Primary Examiner—Richard A. Schacher
Attorney, Agent, or Firm—Stanley B. Kita

[57] ABSTRACT

The invention relates to automatic sheet feed equipment, particularly for use with microfilm aperture cards that permits ready manual insertion of a sheet into the equipment. The sheets are transported on a plate 12 bearing against a register edge 26 and are moved by engagement in the nip between a drive roll 27c and a counter roll 28c. The counter roll is loosely mounted for vertical movement above the plate 12 and the edge of the plate 12 opposite to the edge 26 is unrestricted so that sheets can easily be inserted in the direction of the arrow A. The rolls preferably have polished surfaces and are each chamfered at least on the side away from the edge 26.

7 Claims, 7 Drawing Figures

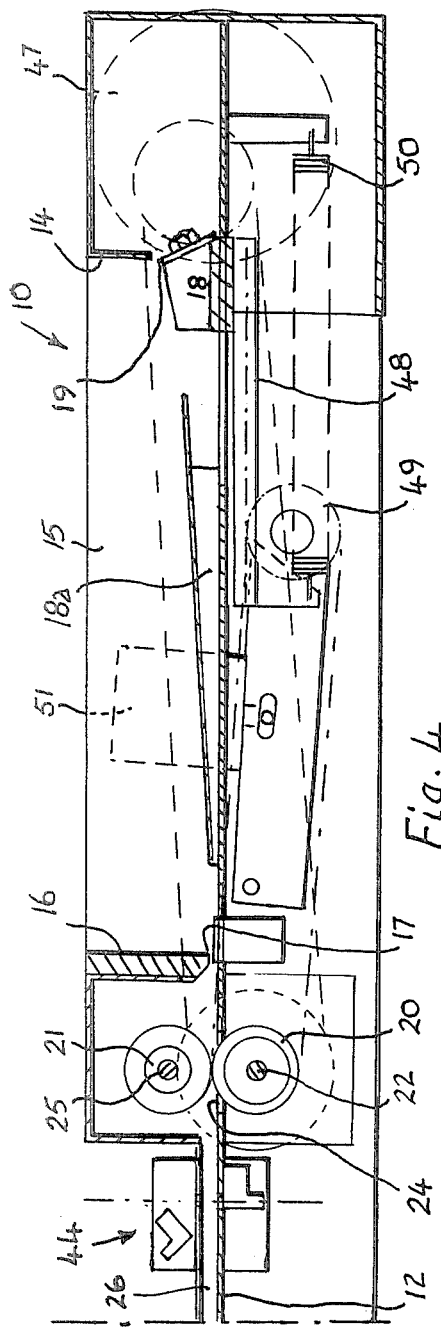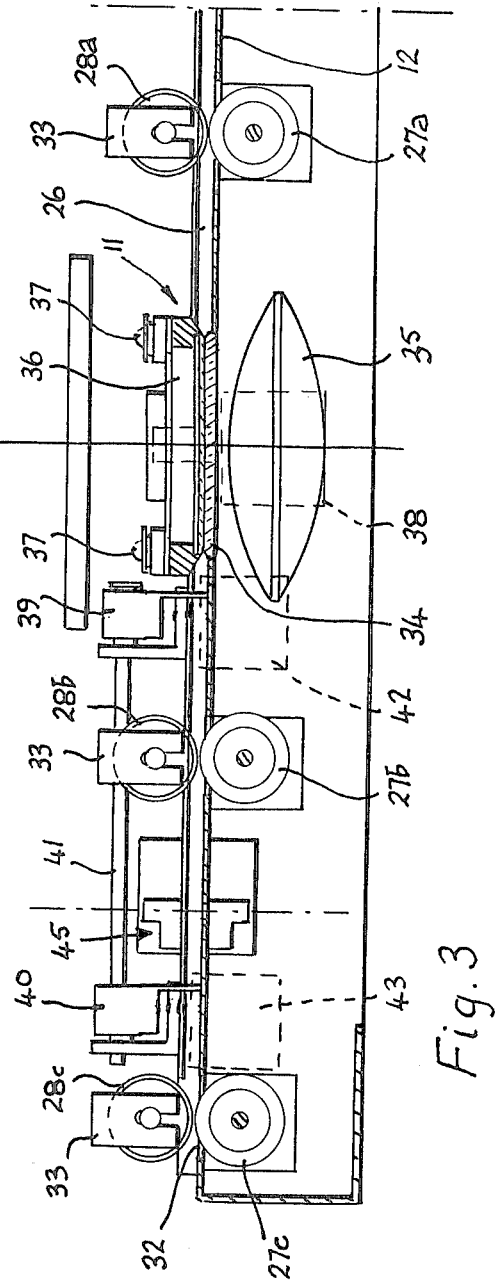

SHEET FEED EQUIPMENT

This invention relates to improved equipment for the feeding of sheets one by one from a stack of sheets and has particular, but not exclusive, utility in the feeding of aperture cards to the optical gate of a microfilm reader and/or printer.

It is known to mount microfilms of documents in the aperture of a support card. The card then serves to support the film, to provide a surface on which easily readable information relating to the film can be applied and to generally facilitate the handling of the film. Microfilm handling equipment is often adapted to receive such cards, each card in turn being placed in the equipment so that the aperture therein lies on the optical axis of a lens system used to project a magnified image of the film onto a viewing and/or printing plane. Where only a small number of cards need to be processed at any given time it is acceptable to manually locate the cards in the optical gate but when circumstances require many cards to be processed it is known to provide automatic feed equipment to receive the many cards in a stack located in a suitable card dispensing hopper and to arrange for the feed equipment to advance the cards one at a time from the hopper into the optical gate.

Known automatic feed equipment for this purpose suffers from the disadvantage that once the feed equipment is in place, the facility for easy manual insertion of cards into the optical gate is lost. Thus with existing feed equipment, cards may have to be stacked individually before being located in the hopper and, once an "automatic" run has been started, the run cannot easily be interrupted to accommodate the processing of a card not contained in the stack located in the hopper.

U.S. Pat. No. 3,148,877 (Brearley) discloses a sheet feed mechanism in which the sheets are conveyed on a sheet-supporting surface with one edge of each sheet in contact with a registration edge. A sheet driving force is generated by coaction between an idler roller below the surface and a thin resilient driven friction wheel above the surface, which thin wheel rotates about an axis inclined at an angle oblique to the registration edge. The oblique mounting of the friction wheel urges an edge of the sheet into contact with the registration edge and making the wheel thin and flexible ensures that the force transverse to the transport direction, which urges the sheet against the registration edge, cannot build up to a level where buckling of the sheet will occur. The removal of a sheet, by pulling it away from the registration edge, or the insertion of a sheet normal to the transport direction, involves pulling or pushing the sheet against the drag of the flexible wheel(s) and this can damage the sheet and/or the wheel(s), and, in the case of insertion, makes it impossible to know for certain whether the sheet is correctly located against the registration edge.

The present invention seeks to provide improved automatic feed equipment which allows for easy manual insertion or removal of sheets and is thus capable of overcoming the aforesaid disadvantage.

According to one aspect of the invention there is provided sheet feed equipment comprising means defining a sheet-supporting plane, a hopper in which a stack of sheets can be located and a station at which sheets fed from the hopper are brought to rest one by one, the hopper and station being spaced apart along the supporting plane, a sheet register surface extending upwardly from the supporting plane along one edge thereof against which register surface one edge of each sheet bears as it moves along the supporting plane from the hopper to the station, a plurality of sheet drive rolls rotatably mounted to turn about axes each spaced below the supporting plane by an amount just less than the radius of the respective drive roll to allow a region of each sheet adjacent to said sheet edge to frictionally engage a surface region of that roll, a counter roll for each drive roll to define a nip therewith, each counter roll being rotatably mounted to turn about an axis disposed above the supporting plane and adjustable in the vertical direction above the supporting plane, means to move the lowermost sheet in the hopper from the hopper to engage it in the nip closest to the hopper, means to drive at least one roll of each pair defining a nip in the direction from the hopper to the station, and means to arrest the movement of a sheet when it reaches the station, the side of the means defining the supporting plane remote from said side register surface being open to permit easy manual placement of sheets in said supporting plane in a direction parallel to said plane but normal to the feed direction occasioned by said drive rolls.

Suitably the means defining the sheet-supporting plane comprises a flat plate apertured to receive part of the drive rolls and having a wall at right angles thereto to define the sheet register surface with the width of the plate (measured normal to said wall) being somewhat less than the width of the sheets (measured normal to said one edge of the sheet). Such an arrangement allows a sheet located on the plate with its said one edge in contact with the wall to be easily removed from the plate (by contacting the protruding edge of the sheet).

To ensure that sheets move along the supporting plane in contact with the register surface, the supporting plane can be inclined with respect to the horizontal so that the register surface is lowermost. In addition, or alternatively, the axis of rotation of the drive rolls can be inclined slightly away from the normal to the register surface to provide that the driving force exerted on each sheet includes a component directed towards the register surface.

To facilitate the easy manual insertion of sheets between the rolls, both rolls defining each nip can have a polished surface (e.g. polished metal rolls) and at least the counter rolls can be chamfered on the side facing away from the register surface.

The means to move the lowermost sheet out of the hopper conveniently comprises a gate across the outlet of the hopper which is wide enough to allow the passage of a single sheet therethrough but which is not wide enough to allow two sheets to pass together through the gate, the gate being upstream of a pair of nip rollers and downstream of a reciprocating sheet pusher. A gate opening of the order 1½ times the sheet thickness would be suitable. Suitably the sheet pusher is provided with a shoulder to engage the trailing end of the lowermost sheet, the shoulder height being slightly less than the thickness of one sheet (e.g. 0.8 times the thickness of the sheet). Preferably the lowermost sheet is supported such that it is slightly curved in a downward direction, this configuration encouraging a straightening of the leading and trailing edges in preparation for passage through the gate and engagement by the shoulder, respectively.

Conveniently a single motor is used to drive all the drive rolls in synchronism and, where provided, the hopper nip rollers and the reciprocating pusher.

In prior art automatic feed equipment for use with aperture cards, all the cards have to be located in the hopper in the same relative orientation so that apertures in all cards in the stack are disposed directly one above another (normally aperture cards of this type are rectangular and the aperture is located wholly on one side of the median transverse line of the card). Feed equipment in accordance with this invention can be provided with means between the hopper and and the station to sense whether a card is being fed from the hopper with the aperture leading or the aperture trailing. This sensing means is described in detail in the specification of our copending patent application Ser. No. 11,088—Feb. 12, 1979 of even date. Using such a sensing means it is possible to provide two independently operable means to arrest the movement of the cards in the station, one of those means being used if a card leaves the hopper "aperture leading" and the other if it leaves "aperture trailing", the card stopping with the aperture correctly positioned in the station in either case.

When feed equipment in accordance with the invention is used in conjunction with a microfilm reader/-printer, the station will include an optical gate and the equipment may be mounted on mutually perpendicular traversing mechanisms to permit easy adjustment of the optical gate in the transport direction of the sheets (X-scan direction) and normal thereto (Y-scan direction).

One embodiment of feed equipment in accordance with the invention will now be described, by way of example, with reference to the accompanying drawings, in which:

FIGS. 3–4 is a sectional side elevation corresponding to FIGS. 1–2,

Figure 7:
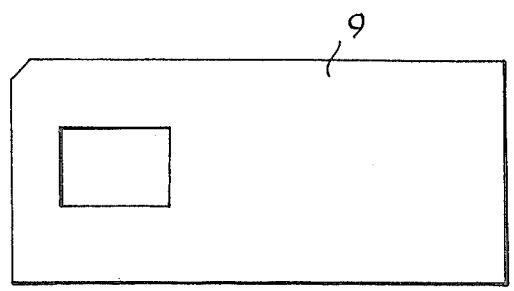
FIG. 7 is an aperture card with which the equipment is to be used.

The feed equipment shown in the drawings is designed to automatically feed aperture cards 9 (as shown in FIG. 7) from a hopper 10 to an optical gate 11. In use the equipment would be mounted over the light housing of a microfilm reader/printer, the optical axis of the light path from the housing to the lens system of the reader/printer being shown by the arrow X in FIG. 3.

The hopper 10 is located at one end of a plate 12 which defines a card-supporting plane, the hopper being provided with walls 13–16 dimensioned to receive a stack of aperture cards 0.18 mm thick. A narrow gate 17 is provided at the bottom of wall 16 (this being 0.25 mm high—i.e. more than one card thick but less than two cards thick) and a reciprocatable pusher 18 is provided adjacent to the wall 14. The pusher has a stroke of a few centimeters and is shown in its rearward position in FIG. 4. Extending above the inclined upper surface of the pusher 18 is the upper edge 19 of a blade clamped to the rear of the pusher 18. The height of the edge 19 above the surface of the pusher is 0.15 mm high (i.e. slightly less than one card thickness).

Figure 6:
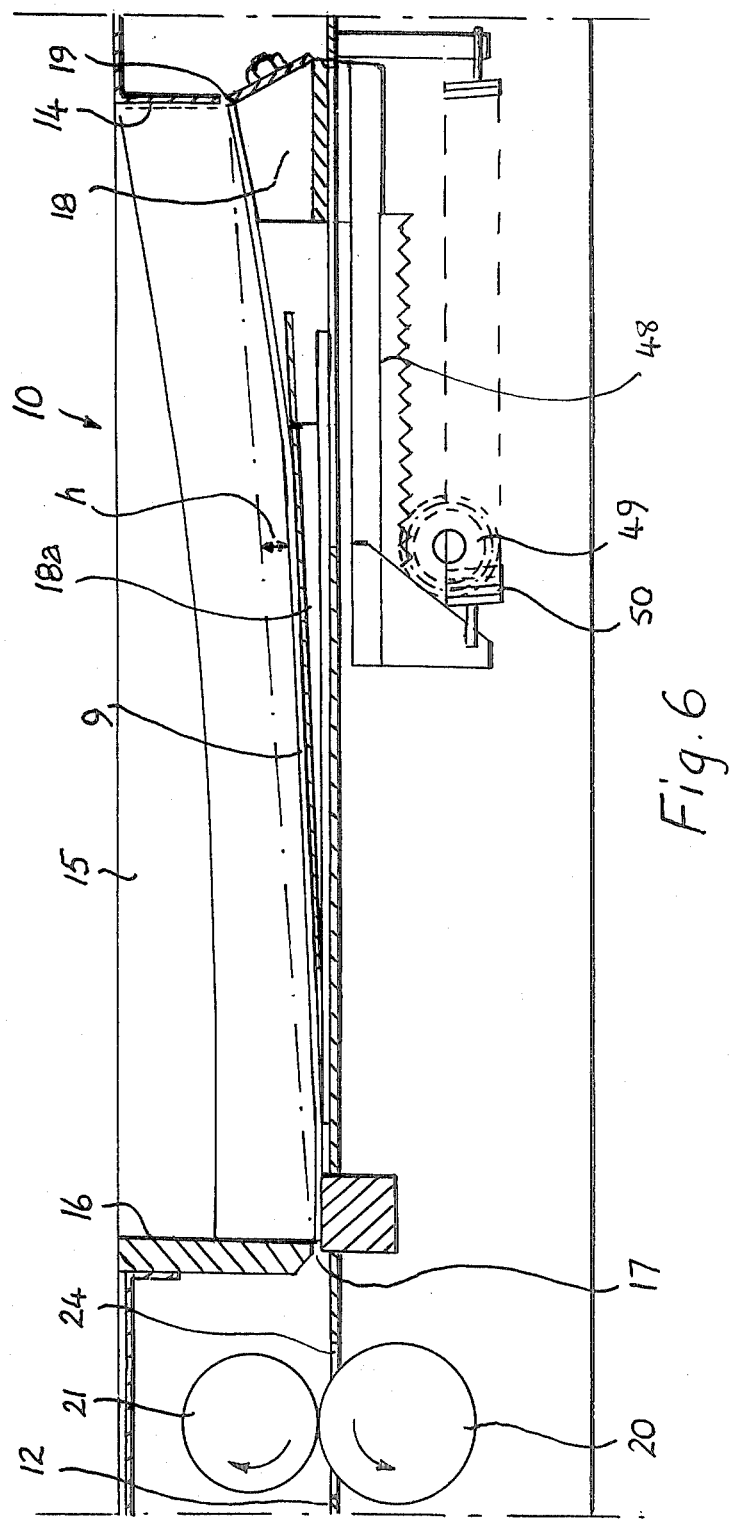
FIG. 6 is an enlarged sectional view of the right-hand end of FIG. 4 showing the mechanism at the bottom of the hopper.

Between the gate 17 and the pusher 18 there is located a card support 18a which allows the lowermost card to curve slightly (e.g. "h" in FIG. 6 would be 4 or 5 mm), this curvature acting to straighten the leading and trailing ends of the card to facilitate engagement of the trailing end by the edge 19 and passage of the leading end through the gate 17. Thus each time the pusher makes a stroke towards the gate 17, the leading end of a card is pushed out into the nip provided by cooperating drive rollers 20, 21 disposed just downstream of the gate 17.

The lower drive rollers 20 are driven from shaft 22 by a belt 23 and project through recesses 24 in the plate 12 to contact the underside of a card as it leaves the hopper. The rollers 21 are idler rollers mounted on a shaft 25.

The roller pairs withdraw a card from the hopper and move it over the upper surface of the plate 12 in contact with a side wall 26 which runs along the entire length of the plate 12 from the hopper outlet. It is registration of one long edge of a card with this wall which acts to accurately guide the card as it moves from the hopper 10 to the optical gate 11. To encourage the card edge to remain in contact with the wall 26 the plate 12 is inclined at some 30° to the horizontal so that the edge to which the wall is attached is lowermost.

Figure 1:
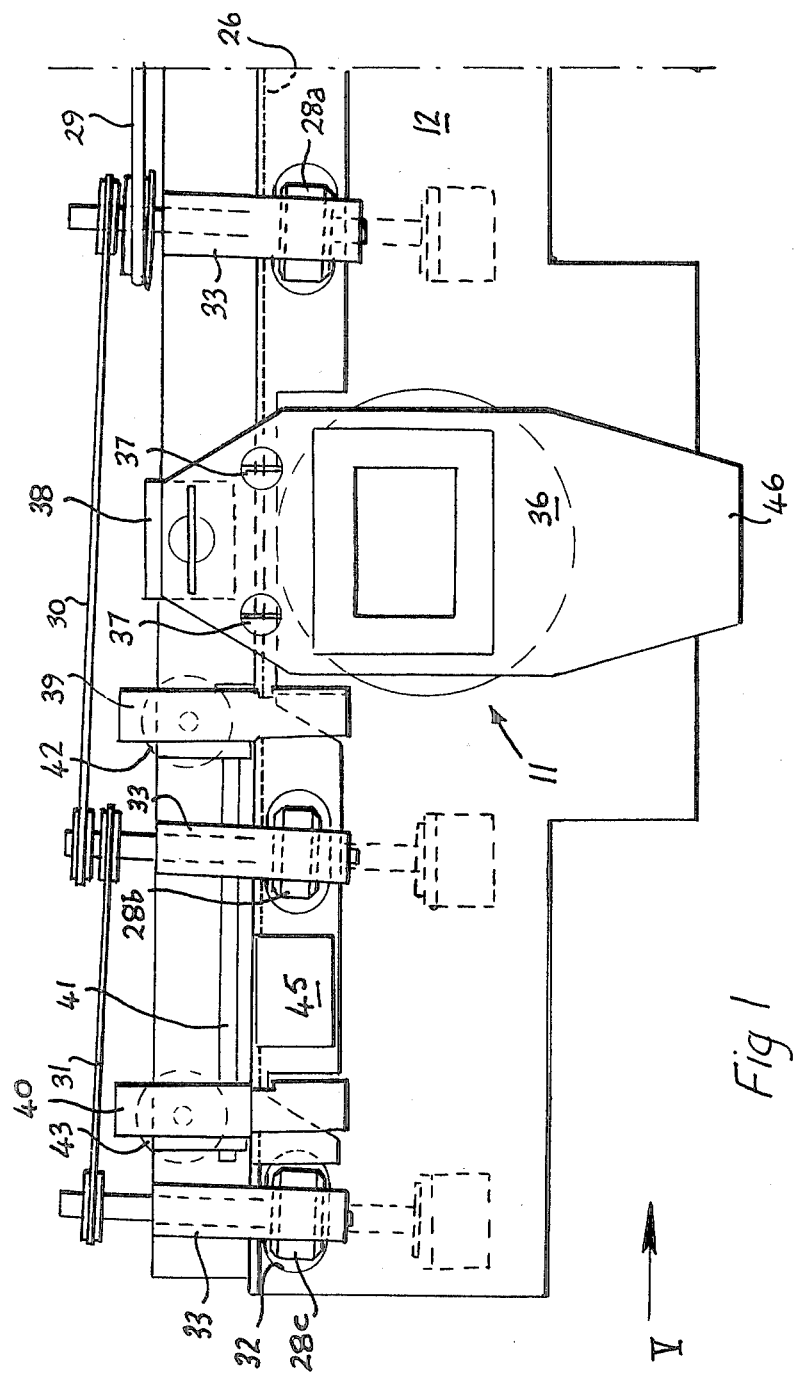
FIGS. 1–2 is a plan from above of the complete feed equipment.
Figure 2:
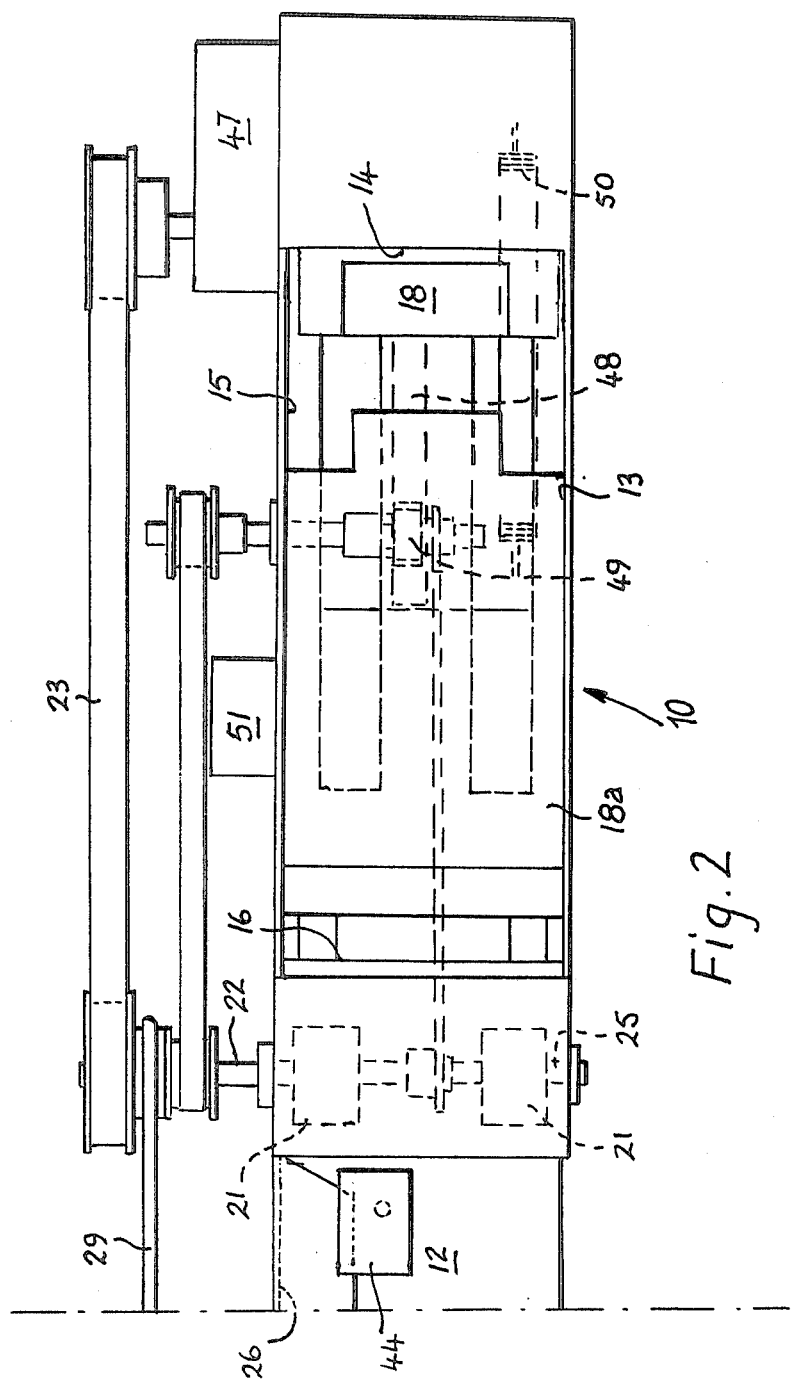
Figure 5:
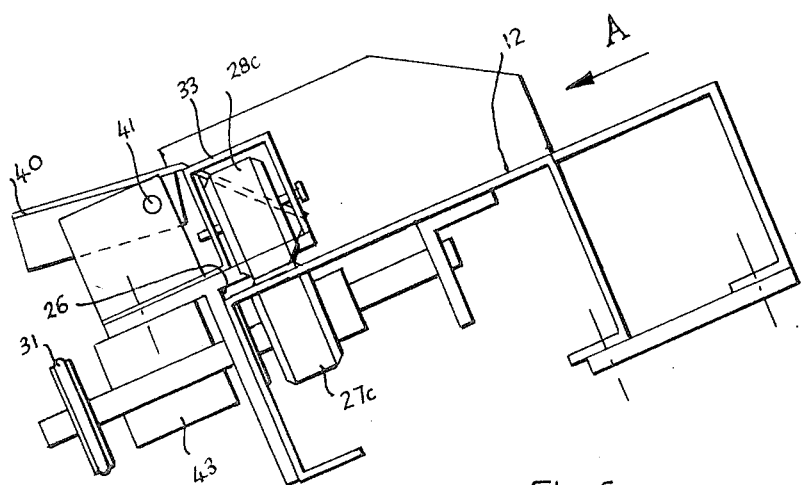
FIG. 5 is an end view in the direction of the arrow V in FIG. 1.

Before the trailing end of each card leaves the nip of the rollers 20, 21, a region of the card close to the long edge in contact with the wall 26, is engaged in the nip between a lower polished metal drive roll 27a and an upper polished metal counter roll 28a. Further downstream are two similar further pairs of rolls 27b, 28b and 27c, 28c. The drive rolls 27a, 27b and 27c are driven by belts 29, 30 and 31 from the shaft 22, and each projects slightly above the upper surface of the plate 12 through an opening 32. To provide a further bias urging the edges of the cards against the wall 26, the drive shafts of the rolls 27a, 27b and 27c are angled one or two degrees (clockwise as seen in FIG. 1) from the normal to the wall 26.

The lightweight counter rolls 28a, 28b and 28c are loosely journalled in stirrups 33 in a manner allowing the axes of these rolls to lift from the surface of the cooperating drive roll to allow a card to pass into the nip defined therebetween. The edges of the drive rolls 27a, 27b and 27c and of the counter rolls 28a, 28b and 28c are chamfered to provide tapering gaps into the nips, at least on the sides facing away from the wall 26. Such a tapering gap facilitates the insertion of a card into the nip in the direction towards the wall 26.

The optical gate 11 is formed by a glass plate 34 inset into the plate 12 to lie just above its upper surface, a lens 35 located below the plate 34 and an apertured metal plate 36 disposed above the plate 34. The aperture in the plate 36 is slightly larger than the aperture in each card 9 and can be covered with a thin sheet of clear glass. The plate 36 is rockably mounted above the plate 12 to move about a pivot axis defined between two fixing screws 37, whereby energization of a solenoid 38 lifts the plate 36 away from the plate 12 to allow a card 9 to pass through the gap formed therebetween.

Downstream of the optical gate 11 two spaced-apart card stops 39 and 40 are provided (see FIG. 3) these being pivoted on a shaft 41 and independently operated by solenoids 42 and 43. When solenoid 42 is energised both stops 39 and 40 are lowered into contact with the upper surface of the plate 12, whereas when solenoid 43 is energised, only the stop 40 contacts the plate 12.

The two stops are required to ensure that whether a card 9 enters the gate 11 with its aperture "leading" or "trailing", it will be stopped in the correct position for the aperture to coincide with the aperture in the plate 36. Thus if it is an "aperture leading" card which is being transported from the hopper 10, stop 39 is used and if it is an "aperture trailing" card, it is the stop 40 which is used.

The mechanism used to sense whether a card is "aperture leading" or "aperture trailing", comprises a photosensitive device 44 disposed just downstream of the roller pairs 20, 21. On one side of the card a light source is located and on the other side of the card a photosensitive detector is located, the light intensity received by the detector being assessed a pre-set time after the pusher 18 has commenced a card dispensing stroke. This pre-set time is determined to ensure that if a card is leaving the hopper 10 with its "aperture leading", the aperture will be between the source and detector of the device 44. It has been found that different light intensities arise in the two cases (i.e. whether the light is passing through the card or through a microfilm in the aperture) and this difference can be used in a simple logic circuit to select which of the solenoids 42 or 43 is to be energised. A preferred arrangement for the device 44 is described in the specification of the copending application referred to above.

A second photosensitive detector 45 is disposed between the card stops 39 and 40 to control the time for which the drive rolls 27b and 27c rotate at the conclusion of a card viewing operation, to ensure that the viewed card is pushed off the left-hand end of the plate 12 into a receiving receptacle (not shown). The width of the plate 12 (measured normal to the wall 26) is a few mm. narrower than the cards 9 over a major part of its length to facilitate manual removal of cards from the plate if it is necessary to interrupt an automatic card feeding operation at any time. It will be noted that the plate 12 is wider than the card width in the vicinity of the optical gate 11 and that the plate 36 is provided with a portion 46 which overlaps this wider portion. This arrangement allows the gate 11 to be opened manually and permits a card to be inserted so that one of its short edges is parallel to the wall 26 if viewing in that direction is required.

From what has been described above it will be appreciated that a single drive motor 47 can be used to power the feed mechanism illustrated. The pusher 18 is reciprocated by a rack 48 and a pinion 49 cooperating with a return spring 50. The pinion 49 is continually rotated when the drive motor 47 is energised but only engages the rack 48 (to effect a card-dispensing stroke of the pusher 18) when solenoid 51 is energised. Thus the pusher 18 is normally held in its right-hand end position by the spring 50 and is moved against the spring's urging to remove a card from the hopper 10 when a pulse of suitable duration is fed to the solenoid 51. The timing of these pulses is under the control of the operator and can be synchronised with the operation of the reader/printer so that cards can be fed automatically to the gate 11 at a rate dictated by the processing time of the reader/printer.

Although the specific equipment described has been designed for use with microfilm processing equipment it should be understood that the invention in its broadest aspect is not so limited. Sheet feed equipment in accordance with the invention can be used in a wide range of other applications.

What is claimed is:

1. Sheet feed equipment comprising means defining a sheet-supporting plane, a hopper in which a stack of sheets can be located and a station at which sheets fed from the hopper are brought to rest one by one, the hopper and station being spaced apart along the supporting plane, a sheet register surface extending upwardly from the supporting plane along one edge thereof against which register surface one edge of each sheet bears as it moves along the supporting plane from the hopper to the station, a plurality of sheet drive rolls rotatably mounted to turn about axes each spaced below the supporting plane by an amount just less than the radius of the respective drive roll to allow a region of each sheet adjacent to said sheet edge to frictionally engage a surface region of that roll, a counter roll for each drive roll to define a nip therewith, each counter roll being rotatably mounted to turn about an axis disposed above the supporting plane and movable in the vertical direction above the supporting plane, means to move the lowermost sheet in the hopper from the hopper to engage it in the nip closest to the hopper, means to drive only the sheet drive roll of each pair defining a nip in the direction from the hopper to the station, and means to arrest the movement of a sheet when it reaches the station, the side of the means defining the supporting plane remote from said side register surface being open to permit easy manual placement of sheets in said supporting plane in a direction parallel to said plane but normal to the feed direction occasioned by said drive rolls, and the supporting plane being inclined with respect to the horizontal so that the side register surface is lowermost.

2. Equipment as claimed in claim 1, in which the means defining the sheet-supporting plane comprises a flat plate apertured to receive part of the drive rolls, the width of the plate being somewhat less than the width of the sheets so that the sheets may extend in cantilever fashion beyond the support plate.

3. Equipment as claimed in claim 2, in which the axis of rotation of each drive roll is inclined slightly away from the normal to the register surface to provide that the driving force exerted on each sheet includes a component directed towards the register surface.

4. Equipment as claimed in claim 2, in which the counter rolls are of polished metal and are chamfered on the side facing away from the register surface.

5. Equipment as claimed in claim 1, in which the means to move the lowermost sheet out of the hopper comprises a gate across the outlet of the hopper which is wide enough to allow the passage of a single sheet therethrough but which is not wide enough to allow two sheets to pass together through the gate, the gate being upstream of a pair of nip rollers and downstream of a reciprocating sheet pusher.

6. Equipment as claimed in claim 5, in which the sheet pusher is provided with a shoulder to engage the trailing end of the lowermost sheet, the shoulder height being slightly less than the thickness of one sheet.

7. Equipment as claimed in claim 1, in which a single motor is used to drive all the drive rolls in synchronism and, where provided, the hopper nip rollers and the reciprocating pusher.

* * * * *